April 11, 1950   D. S. SHERARD   2,503,421
VENTILATING APPARATUS
Filed July 30, 1948   5 Sheets-Sheet 2

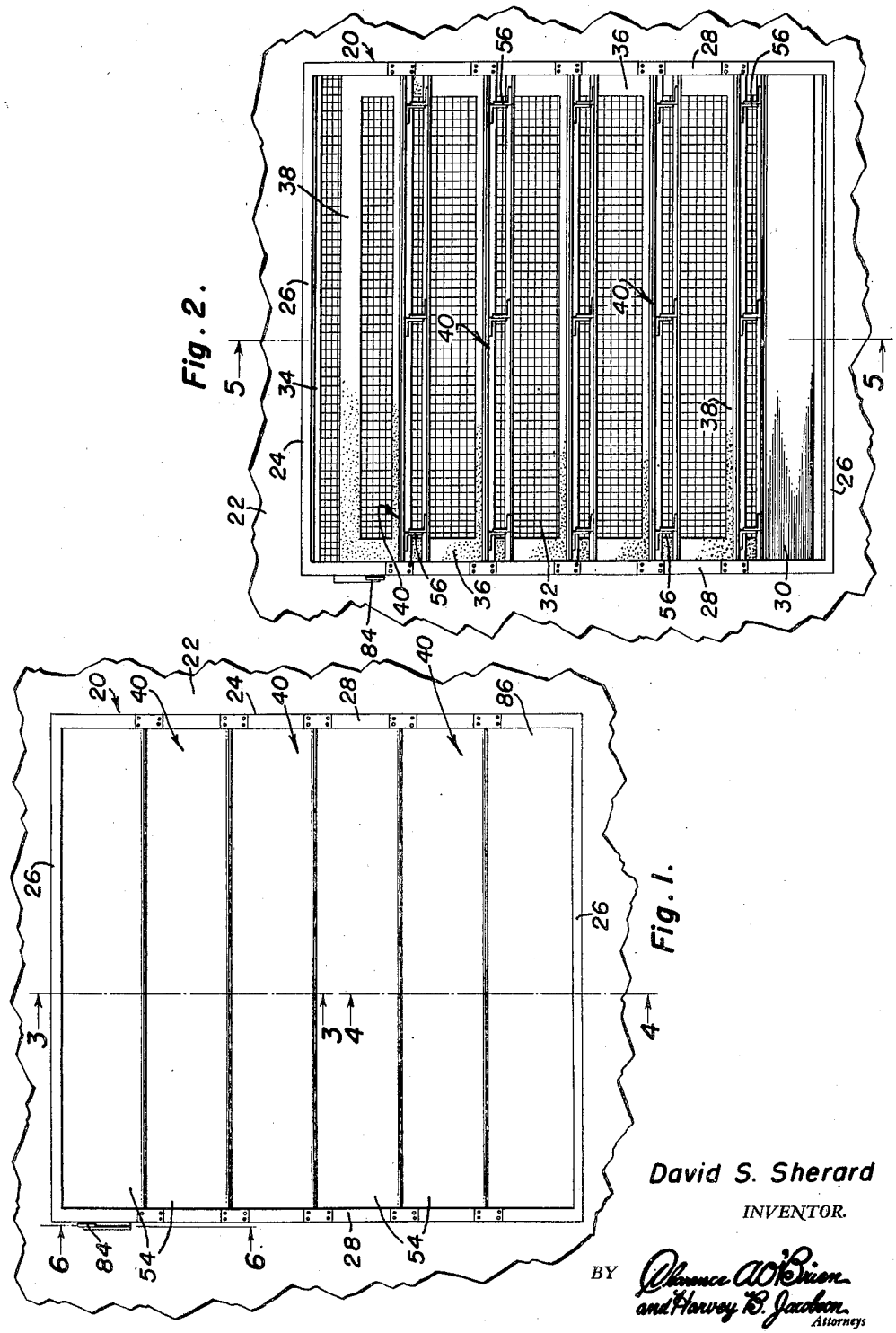

David S. Sherard
INVENTOR.

April 11, 1950  D. S. SHERARD  2,503,421
VENTILATING APPARATUS
Filed July 30, 1948  5 Sheets-Sheet 3

David S. Sherard
INVENTOR.

BY Clarence A. O'Brien
and Harvey B. Jacobson
Attorneys

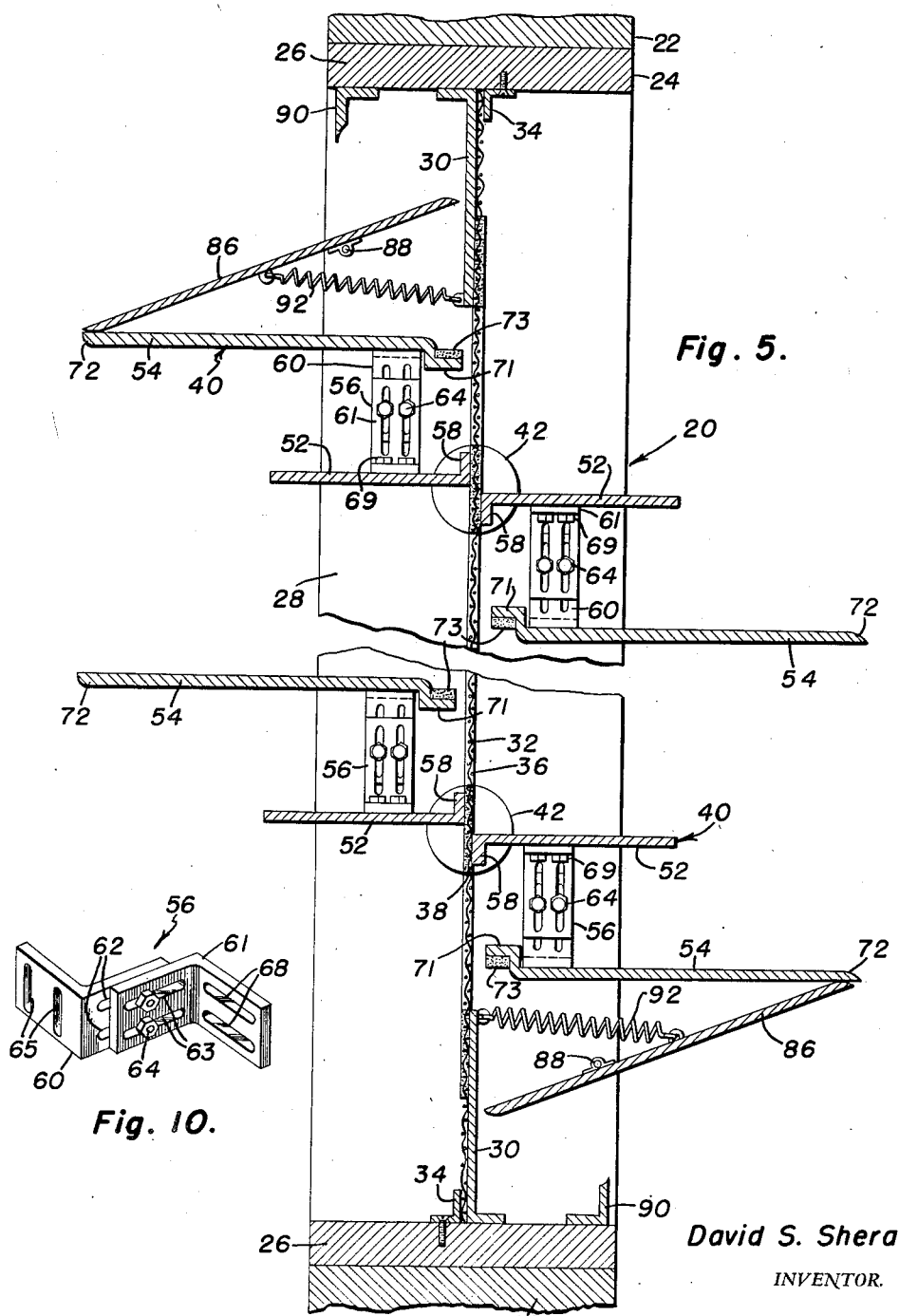

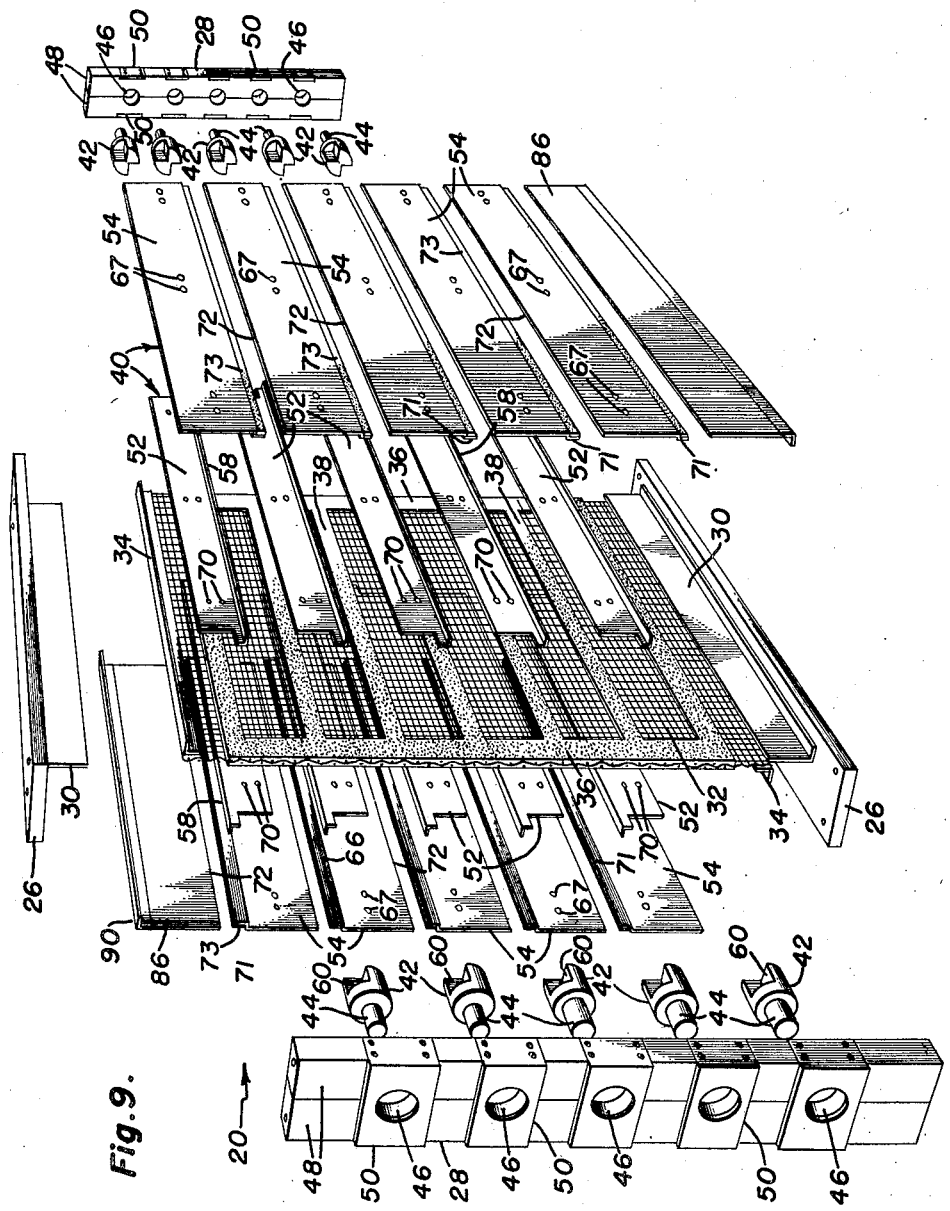

Patented Apr. 11, 1950

2,503,421

UNITED STATES PATENT OFFICE 2,503,421

VENTILATING APPARATUS

David S. Sherard, Jackson, Miss.

Application July 30, 1948, Serial No. 41,582

15 Claims. (Cl. 98—88)

This invention relates to new and useful improvements and structural refinements in ventilating devices for homes, offices, stores, factories, and the like, and the principal object of the invention is to facilitate proper and adequate ventilation without admitting sun rays, rain, insects, etc., matters being so arranged that the ventilating apparatus, when inoperative, provides an unbroken surface both on the inside and on the outside of the wall in which it is mounted.

This object is achieved by the provision of a ventilating apparatus which includes a plurality of shutter members each consisting, inter alia, of inner and outer louvres, the shutter members being pivotally mounted in a suitable frame and being swingable from a closed, overlapping position to a spaced ventilating position, the opening and closing of the shutter members being accomplished by means of a simple, slidable actuating bar. When the shutter members are closed, the outer louvres thereof overlap one another in such manner as to provide an unbroken surface on both the inside and outside of the wall in which the apparatus is mounted, while when the shutter members are open, the louvres thereof are disposed in a vertically spaced, superimposed relation so that unrestricted passage of air through the apparatus is facilitated, but rain and sun rays are effectively excluded.

An important feature of the invention resides in the provision of a screen in the ventilating apparatus, this screen being disposed between the inner louvres of the shutter members and effectively preventing the passage of insects, etc. through the ventilating unit.

An additional feature of the invention resides in the mounting of the screen between the inner louvres of the shutter members, in such manner that the shutter members may be opened or closed as desired, without interfering with the screen.

A still further feature of the invention resides in the provision of means for adjustably spacing the outer louvres of the shutter members from the inner louvres thereof, whereby the overall "thickness" of the ventilating apparatus may be varied so as to conform to the thickness of the wall in which it is mounted.

An important advantage of the invention resides in its simplicity of construction and operation, in its efficiency in use, and in its adaptability to economical manufacture.

With the above more important objects in view and such other objects as may become apparent as this specification proceeds, the invention consists essentially of the construction and arrangement of parts as shown in the accompanying drawings in which:

Figure 1 is an elevational view of the ventilating apparatus in its closed position;

Figure 2 is a further elevational view thereof, but showing the same in an open position;

Figure 5 is a cross sectional view, taken substantially in the plane of the line 5—5 in Figure 2;

Figure 9 is a perspective view of the invention, and

Figure 10 is a perspective view of one of the adjustable brackets used in the invention.

Like characters of reference are employed to designate like parts in the specification and throughout the several views.

Figure 3:
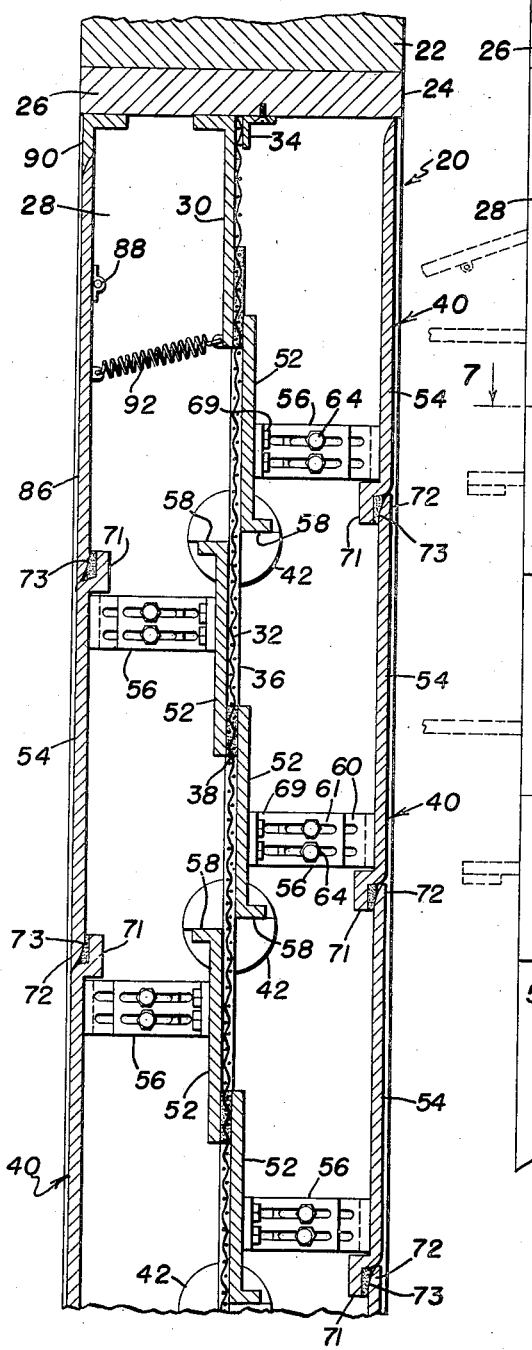
Figure 3 is a cross sectional view, taken substantially in the plane of the line 3—3 in Figure 1.

Referring now to the accompanying drawings in detail, the invention consists of a ventilating apparatus designated generally by the reference character 20, the same being intended for installation in a suitable opening in a wall 22, and including in its construction a substantially rectangular frame 24. The latter consists of upper and lower pieces 26 and a pair of side pieces 28, the construction of the latter being hereinafter more fully described.

Figure 4:
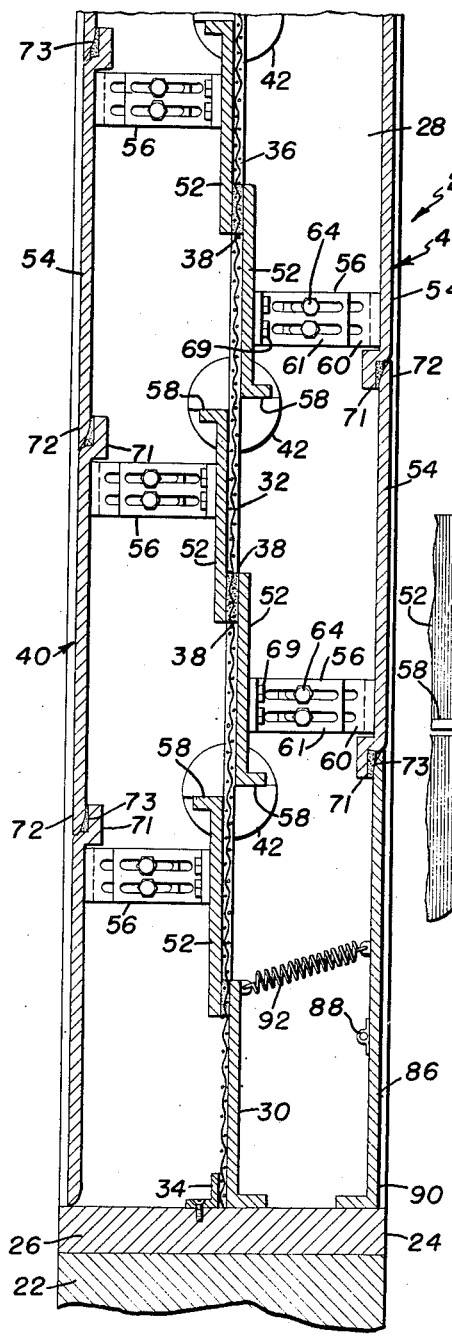
Figure 4 is a cross sectional view, taken substantially in the plane of the line 4—4 in Figure 1.

The frame 24 is provided intermediately the "thickness" thereof with stationary louvres 30 of an L-shaped cross sectional configuration, and a foraminous partition or screen 32 is stretched in the frame, being retained in position by means of the louvres 30 and by means of suitable angles 34 which, as well as the louvres 30, are suitably secured to the upper and lower pieces 26 of the frame, as is best shown in Figures 3, 4 and 5.

The screen 32 is embedded in a perimetric gasket 36 and strips of gasket material 38 extend transversely of the screen, as will be clearly apparent.

A set of horizontal shutter members designated generally by the reference characters 40 extend transversely of the frame 24, each of these members embodying in its construction a pair of opposed, rotatable fulcrum blocks 42 provided with cylindrical shanks 44 so that they may rotatably engage suitable apertures 46 with which the side pieces 28 of the frame 24 are formed.

It is to be noted that the apertures 46 in which the shafts or shanks 42 of the blocks 44 are journaled are arranged in a vertical row in the side pieces 28, and if desired, each of the side pieces may be composed of two complementary half sections 48 separably connected together by means of U-shaped brackets 50, as is best shown in the left-hand side of Figure 9. The half sections 48 are formed in the abutting portions thereof with complementary, semi-cylindrical openings defining the aforementioned apertures 46, and it is to be noted that by virtue of this construction, installation of the entire apparatus in the opening of the wall 22 will be substantially facilitated.

Referring again to the structure of each of the shutter members 40, this also includes a pair of inner louvres 52 and a pair of outer louvres 54, each of the outer louvres being adjustably secured to one of the inner louvres by suitable brackets 56, hereinafter more fully described.

Figure 8:
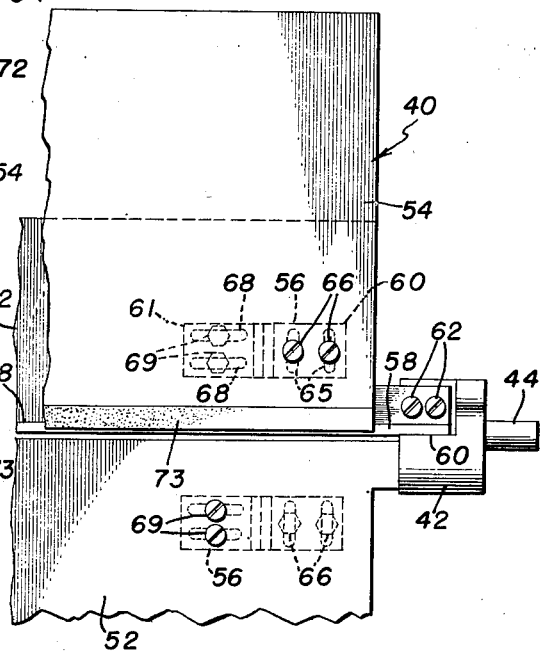
Figure 8 is a fragmentary elevational detail showing the mounting of the shutter members.

It is to be noted that the inner louvres 52 in each shutter member are disposed in an offset parallel relation and are provided at the adjacent longitudinal edges thereof with lateral flanges 58. End portions of the flanges project beyond the ends of the louvres 52 and are seated in suitable recesses 60 formed in the aforementioned blocks 42 as is best shown in Figure 9, being secured in the recesses by suitable bolts 62, as shown in Figure 8. It is to be also noted that the louvres 52 in each shutter member extend tangentially in a diametrically spaced relation with the blocks 42, the two inner louvres in each member being disposed at the opposite sides of the aforementioned screen 32. As is best shown in Figures 3, 4 and 5, the common axis of the blocks 42 is disposed in the plane of the screen 32, whereby positioning of the louvres 52 at the opposite sides of the screen is facilitated.

As already stated, each of the outer louvres 54 is adjustably secured to one of the inner louvres 52, matters being so arranged that the outer and inner louvres are disposed substantially in a spaced parallel relation by virtue of the brackets 56. It is to be also noted that the outer louvres 54 are of greater width than the louvres 52, as is best illustrated in Figures 3, 4 and 5. Each of the brackets 56 embodies in its construction a pair of half-sections 60, 61 formed with coinciding slots 62, 63 respectively (see Figure 10) to accommodate suitable fastening elements such as the bolts 64, whereby the half-sections 60, 61 of each bracket are adjustably secured together. In other words, by simply loosening the bolts 64, the half-sections 60, 61 of the brackets 56 may be slid together or apart, thereby correspondingly decreasing or increasing the distance between the associated inner and outer louvres 52, 54, respectively.

The bracket sections 60 are also formed with pairs of vertical slots 65 to adjustably receive suitable bolts 66 extending through pairs of horizontally aligned apertures 67 formed in the outer louvres 54. Similarly, the bracket sections 61 are formed with pairs of horizontal slots 68 to adjustably receive suitable bolts 69 extending through pairs of vertically aligned apertures 70 formed in the inner louvres 52, whereby the brackets 56 adjustably secure the louvres 52, 54 together, the purpose of which adjustment will be hereinafter described.

By virtue of the rotatability of the fulcrum blocks 42 in the frame 24, the entire shutter members 40 are swingable from a closed position shown in Figures 1, 3 and 4 to a ventilating position shown in Figures 2 and 5, matters being so arranged that when the shutter members are closed, the inner louvres 52 lie flat against the opposite sides of the screen 32 (or against the gasket strips 38 at the opposite sides of the screen, as the case may be). Moreover, it is to be noted that longitudinal edges of the inner louvres 52 overlap one another when the shutter members are closed, as shown in Figures 3 and 4, the gasket strips 38 effectively preventing passage of air through the closed inner louvres, as will be clearly understood. Moreover, longitudinal edges of the outer louvres 54 are offset as at 71, the offset longitudinal edge portion of one outer louvre in each shutter member being adapted to overlap a coacting longitudinal edge portion 72 of the next adjacent outer louvre when the shutter members are closed, as is best shown in Figures 3 and 4. Suitable weatherstrips 73 are provided in the offset portions 71 of the louvres 54, for obvious reasons.

It will be apparent from the foregoing that when the ventilator is closed, the inner louvres 52 will separate the space between the outer louvres 54 into a pair of juxtaposed chambers, and the overlapping relation of the outer louvres will assure that air does not pass through the ventilator when the latter is closed. It is to be noted that by virtue of the slots 62, 63 in the bracket sections 60, 61, the spacing of the louvres 54 with respect to the louvres 52 may be increased or decreased, whereby the "thickness" of the closed ventilator may be adjusted to correspond to the thickness of the wall in which it is mounted. Under such circumstances the closed outer louvres 54 will provide unbroken surfaces, constituting a continuity of the inner and outer surfaces of the wall 22.

Moreover, the vertical slots 65 in the bracket sections 60 will permit the outer louvres 54 to be adjusted vertically with respect to the inner louvres 52, so that the outer louvres may be properly fitted to the opening in the wall 22. Similarly, horizontal adjustability of the outer louvres 54 in the wall opening is facilitated by the horizontal slots 68 in the bracket sections 61, which permit the ends of the outer louvres to be properly aligned.

When the shutter members 40 are swung to an open ventilating position, the louvres 52, 54 are disposed in substantially horizontal, parallel planes, so that the spaces therebetween facilitate free passage of air through the ventilator, as is clearly shown in the accompanying Figure 5. Here again, the slots 62, 63 in the brackets 56 facilitate variation in the spacing of the louvres, thereby increasing or decreasing the spaces through which the air may pass for ventilating purposes.

Figure 6:
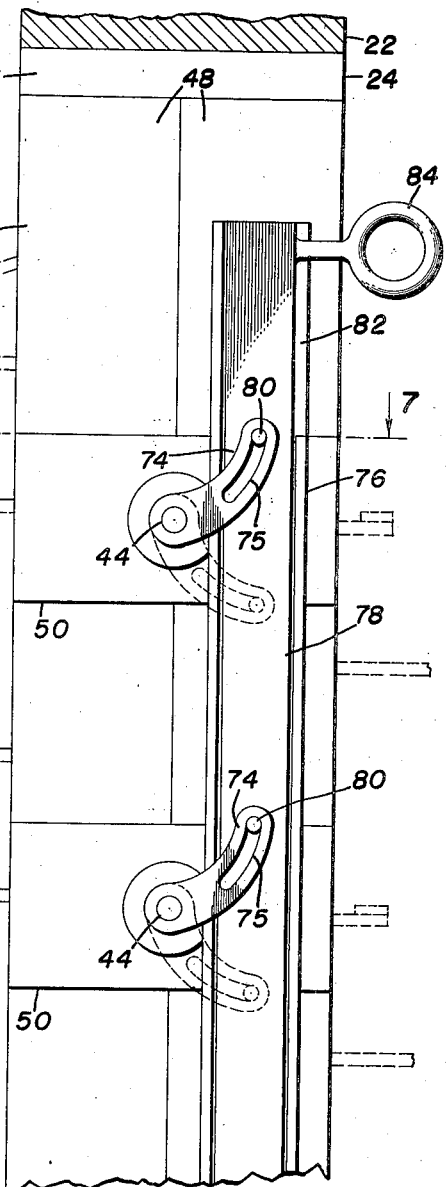
Figure 6 is a fragmentary cross sectional view, taken substantially in the plane of the line 6—6 in Figure 1.
Figure 7:
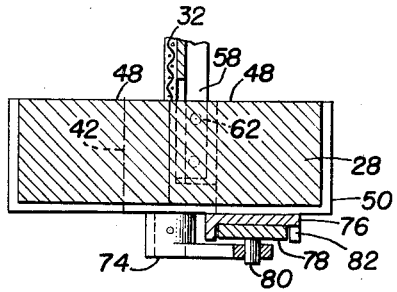
Figure 7 is a cross sectional view, taken substantially in the plane of the line 7—7 in Figure 6.

Closing and opening of the shutter members 40 is facilitated in the following manner:

The shanks or shafts 44 of the blocks 42 at one side of the frame 24 are provided with arcuate cranks 74 formed with arcuate slots 75 as is best shown in Figure 6, while the adjacent side piece 28 carries a guide 76 of a U-shaped cross sectional configuration, best shown in Figure 7. An actuating bar 78 is slidable in the guide 76 and is provided with a set of laterally projecting pins 80 which operatively engage the slots 75 of the cranks 74, so that by simply sliding the bar 78 upwardly or downwardly, closing and opening of the shutter members will be effected, as will be clearly apparent.

One end portion at one side of the guide 76 is relieved as at 82 so as to accommodate a slidable actuating eye 84 which is secured to the bar 78, the eye 84 projecting outwardly from the wall 22 in which the ventilator is mounted, so that by simply sliding the eye upwardly or downwardly, the shutter members may be closed or opened, as desired.

Individual upper and lower louvres 86 are pivotally mounted in the frame 24 as at 88, these individual louvres coacting with the uppermost and lowermost of the outer louvres 54, and also coacting with complementary angles 90 which are suitably secured to the upper and lower pieces 26 of the frame 24, as is best shown in Figures 3, 4 and 5. That is to say, when the shutter members are closed, the louvres 86 overlap the angles 90 and the next adjacent of said portions 71 as shown in Figures 3 and 4, but when the shutter members are opened, the louvres 86 are urged to obliquely disposed open positions, as shown in Figure 5. Suitable tension springs 92 extend between the louvres 86 and the aforementioned louvres 30, whereby not only the louvres 86, but the entire ventilator assembly is normally urged to a closed position, as shown in Figure 3.

It is believed that the advantages and use of the invention will be clearly apparent from the foregoing disclosure, and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having thus described the invention, what is claimed as new is:

1. In a ventilating apparatus, a shutter member comprising opposed and rotatable fulcrum blocks, tangentially extending inner louvres having ends thereof secured to said blocks, outer louvres secured to said inner louvres in spaced substantially parallel relation, and means for rotating said blocks.

2. The device as defined in claim 1 together with adjustable means for securing said outer louvres to said inner louvres.

3. In a ventilating apparatus, a set of shutter members each comprising opposed and rotatable fulcrum blocks, tangentially extending inner louvres having ends thereof secured to said blocks, outer louvres secured to said inner louvres in spaced substantially parallel relation, said louvres in each shutter member having longitudinal edges adapted to overlap coacting edges in a next adjacent member, and means for simultaneously rotating said blocks whereby said louvres may be swung from a closed, overlapped position to a spaced ventilating position.

4. The device as defined in claim 3 together with adjustable means for securing said outer louvres to said inner louvres.

5. The device as defined in claim 3 wherein the inner louvres in each member are mutually spaced, together with a foraminous partition extending between said inner louvres.

6. A ventilating apparatus comprising a frame, a set of shutter members provided in said frame and each comprising a pair of opposed fulcrum blocks rotatably mounted in said frame, a pair of spaced tangential inner louvres having ends thereof secured to said blocks, a pair of outer louvres, adjustable brackets securing each outer louvre to one of said inner louvres in spaced parallel relation, said louvres in each shutter member having longitudinal edges adapted to overlap coacting edges in the next adjacent member, a foraminous partition secured in said frame and disposed between said inner louvres, and means for simultaneously rotating said blocks whereby said louvres may be swung from a closed, overlapped position to a spaced ventilating position.

7. The device as defined in claim 6 wherein said means include a crank provided on one fulcrum block in each pair, and a slidable actuating bar operatively engaging the several cranks.

8. The device as defined in claim 6 together with resilient means for urging said shutter members to a closed position.

9. A ventilating apparatus comprising in combination, a substantially rectangular frame including opposed side pieces, a flat screen secured in said frame, a set of shutter members extending transversely in said frame and each comprising a pair of opposed fulcrum blocks rotatably mounted in said side pieces with their common axis disposed in the plane of said screen, a pair of diametrically spaced and tangentially extending inner louvres disposed at the opposite sides of said screen and having ends thereof secured to said blocks, a pair of outer louvres, adjustable brackets securing each outer louvre to one of said inner louvres in spaced parallel relation, said louvres in each shutter member having longitudinal edges adapted to overlap coacting edges of the next adjacent member, means for simultaneously rotating said blocks whereby said louvres may be swung from a closed, overlapped position to a spaced ventilating position, and resilient means for closing said louvres.

10. The device as defined in claim 9 wherein said first mentioned means include a slotted crank provided on one fulcrum block in each pair, an actuating bar slidable on said frame, and pins provided on said bar, said pins operatively engaging the slots of said cranks.

11. The device as defined in claim 9 wherein one longitudinal edge portion of each outer louvre is offset to receive a coacting longitudinal edge portion of the next adjacent outer louvre when said louvres are in a closed, overlapping position.

12. The device as defined in claim 11 together with a weatherstrip provided between said coacting edge portions.

13. The device as defined in claim 9 wherein said inner louvres in their closed position are engageable with the opposite side surfaces of said screen.

14. The device as defined in claim 9 wherein each of said adjustable brackets comprises a pair of half-sections attached to said inner and outer louvres and formed with coinciding slots, and fastening elements provided in said slots for adjustably securing said half-sections together.

15. The device as defined in claim 14 wherein said half-sections are provided with additional slots, and further fastening elements provided in said last mentioned slots for adjustably securing said half-sections to said louvres.

DAVID S. SHERARD.

REFERENCES CITED

The following references are of record in the file of this patent:

UNITED STATES PATENTS

| Number | Name | Date |
| --- | --- | --- |
| 1,091,844 | Holland | Mar. 31, 1914 |
| 1,470,262 | Henriksen | Oct. 9, 1923 |
| 1,551,753 | Lane | Sept. 1, 1925 |